US008209242B1

(12) United States Patent
Henderson et al.

(10) Patent No.: US 8,209,242 B1
(45) Date of Patent: Jun. 26, 2012

(54) INVENTORY MANAGEMENT SYSTEM

(75) Inventors: Michael Henderson, Parker, CO (US); David Pytel, Dillon, CO (US); Preston McCreary, Larkspur, CO (US); Gerson Cortes, Southampton, NJ (US)

(73) Assignee: Flowvision, LLC, Dillon, CO (US)

( * ) Notice: Subject to any disclaimer, the term of this patent is extended or adjusted under 35 U.S.C. 154(b) by 1047 days.

(21) Appl. No.: 11/218,971

(22) Filed: Sep. 2, 2005

(51) Int. Cl.
*G06Q 10/00* (2006.01)

(52) U.S. Cl. .......... 705/28; 705/7; 705/22; 705/29; 705/26; 705/10; 705/8; 705/9; 705/16; 700/97; 700/99; 700/100; 700/106; 700/105; 700/103; 700/102; 700/95; 700/90; 700/107

(58) Field of Classification Search ............ 705/28
See application file for complete search history.

(56) References Cited

U.S. PATENT DOCUMENTS

| | | | |
|---|---|---|---|
| RE36,360 E | 10/1999 | Costanza | 705/8 |
| 5,963,919 A | 10/1999 | Brinkley et al. | 705/28 |
| 6,078,900 A | 6/2000 | Ettl et al. | 705/28 |
| 6,128,588 A | 10/2000 | Chacon | 703/6 |
| 6,198,980 B1 | 3/2001 | Costanza | 700/99 |
| 6,341,271 B1 | 1/2002 | Salvo et al. | 705/28 |
| 6,418,416 B1 | 7/2002 | Rosenberg et al. | 705/28 |
| 6,594,535 B1 | 7/2003 | Costanza | 700/97 |
| 6,611,726 B1 | 8/2003 | Crosswhite | 700/99 |
| 2002/0072988 A1 | 6/2002 | Aram | |
| 2002/0143669 A1 | 10/2002 | Scheer | |
| 2003/0055731 A1* | 3/2003 | Fouraker et al. | 705/22 |
| 2004/0068455 A1* | 4/2004 | Jacobus et al. | 705/36 |
| 2006/0026072 A1 | 2/2006 | Suguro | |
| 2008/0177593 A1 | 7/2008 | Clayton et al. | |
| 2008/0177599 A1 | 7/2008 | McPhetrige | |

OTHER PUBLICATIONS

Distribution made lean: the key that unlocks operations on the plant floor can unlock operations in the warehouse, too. Zylstra, Kirk. Industrial Engineer , vol. 37 , No. 1 , p. 31(5) , Jan. 2005.*

* cited by examiner

*Primary Examiner* — F. Zeender
*Assistant Examiner* — Fawaad Haider
(74) *Attorney, Agent, or Firm* — Marsh Fischmann & Breyfogle LLP

(57) ABSTRACT

Provided is a statistical inventory management system that optimizes inventory investment using historical usage and/or consumption of an inventory component. Generally, the system determines an target inventory level. Once actual inventory is below the replenishment level, an additional supply of an inventory component is ordered. The target inventory level is determined based at least in part on the usage variability of the component. In one arrangement, the usage of the component over periods of time that correspond to a supplier lead-time of that component are utilized. The usage groups generally include several days (or other time periods) of usage data and typically haw a reduced variance compared to, for example, day-to-day usage. These reduced variance usage groups may be utilized to more accurately calculate future inventory levels for an inventory component. Further, all information is based on actual historical usage data as opposed to unsupported forecasts (e.g., sales growth forecasts).

40 Claims, 10 Drawing Sheets

| Date | 5/1 | 5/2 | 5/3 | 5/4 | 5/5 | 5/6 | 5/7 | 5/8 | 5/9 | 5/10 | 5/11 | 5/12 | 5/13 | 5/14 | 5/15 | 5/16 | 5/17 | 5/18 | 5/19 | 5/20 |
|---|---|---|---|---|---|---|---|---|---|---|---|---|---|---|---|---|---|---|---|---|
| Part A | 55 | 77 | 71 | 96 | 130 | 135 | 167 | 146 | 96 | 50 | 187 | 176 | 132 | 169 | 246 | 142 | 121 | 138 | 220 | 200 |
| Part B | 2 | 5 | 8 | 1 | 0 | 7 | 2 | 7 | 3 | 4 | 4 | 0 | 9 | 2 | 3 | 7 | 0 | 5 | 5 | 4 |

FIG.3

| Part Number | KANBAN? | Target Service Level | Supplier Lead Time | MOQ | ABC Segmentation | Unit Cost |
|---|---|---|---|---|---|---|
| 111 | Yes | 99.999% | 5 | 10 | A | $5.25 |
| 222 | Yes | 99.999% | 5 | 10 | A | $9.90 |
| 333 | Yes | 99.999% | 5 | 50 | B | $1.00 |
| 444 | Yes | 99.999% | 15 | 1,000 | C | $0.25 |

FIG.4

| Date | 5/1 | 5/2 | 5/3 | 5/4 | 5/5 | 5/6 | 5/7 | 5/8 | 5/9 | 5/10 | 5/11 | 5/12 | 5/13 | 5/14 | 5/15 | 5/16 | 5/17 | 5/18 | 5/19 | 5/20 |
|---|---|---|---|---|---|---|---|---|---|---|---|---|---|---|---|---|---|---|---|---|
| Part A | 55 | 77 | 71 | 98 | 130 | 135 | 167 | 146 | 96 | 50 | 187 | 176 | 132 | 169 | 246 | 142 | 121 | 138 | 220 | 200 |
| Part A | - | - | - | - | - | - | 731 | 822 | 841 | 820 | 911 | 957 | 954 | 956 | 1056 | 1102 | 1173 | 1124 | 1168 | 1236 |
| Part B | 2 | 5 | 9 | 1 | 0 | 7 | 2 | 7 | 3 | 4 | 4 | 0 | 9 | 2 | 3 | 7 | 0 | 5 | 5 | 4 |
| Part B | - | - | 18 | 15 | 10 | 8 | 9 | 16 | 12 | 14 | 11 | 8 | 13 | 11 | 14 | 12 | 10 | 12 | 10 | 14 |

FIG.6

| LT Sum (4 day) | 76 | 74 | 66 | 63 | 61 | 63 | 71 | 69 | 74 | 57 |
|---|---|---|---|---|---|---|---|---|---|---|
| μ (LT Sum) | 68.4 | • Calculate across LT Sums | | | | | | | | |
| σ (LT Sum) | 5.0 | – μ mean | | | | | | | | |
| SL | 99.9 | – σ Standard Deviation | | | | | | | | |
| x (# of SD) | 3 | • Determine Service Level SL and "x" # of Std. Devs. | | | | | | | | |
| Stat KB | 83.4 | • Stat Kanban Qty = μ + x×σ | | | | | | | | |

FIG. 10

| Service Level | 80% | 90% | 94% | 95% | 96% | 97% | 98% | 99% | 99.5% | 99.9% | 99.99% |
|---|---|---|---|---|---|---|---|---|---|---|---|
| Service Level Factor | 0.84 | 1.28 | 1.55 | 1.64 | 1.75 | 1.88 | 2.05 | 2.33 | 2.57 | 3.09 | 3.72 |

FIG.11

INVENTORY MANAGEMENT SYSTEM

FIELD OF THE INVENTION

The present invention relates generally to inventory management, and more particular, to use of inventory procurement/replenishment lead-time information for use in reducing on-hand inventory.

BACKGROUND

Inventory management is important for retail businesses involved with the sale of finished goods and products as well as for manufacturing businesses that produce finished goods, products and/or components for use in other goods and products. Stated otherwise, goods and material availability, having the proper amount of finished goods, products, components and/or raw materials, is critical to the success of a business. For instance, if a retail business selling finished goods has an insufficient on-hand inventory, sales may be lost when customers go elsewhere to purchase the unavailable goods. This may also erode the customer base of the business. Alternatively, maintaining an excess of on-hand inventory may increase costs for the business. Costs associated with excess inventory may include, without limitation maintenance costs, storage costs, spoilage costs, damage costs, the waste of assets such as cash, the excess expense of interest, and/or depreciation of the value of the inventory. In any case, excessive inventory generally ties up capital that may be more effectively utilized elsewhere. Manufacturing businesses face many of the same challenges. In this regard, a manufacturer may require a plurality of manufacturing parts/components for use in producing a good. An insufficient on-hand inventory of any such components may result in delayed production, delayed delivery and, ultimately low customer satisfaction. As with retail businesses, manufacturing businesses also must balance the need for on-hand inventory with the costs of carrying excessive inventory.

Generally, this balance includes an analysis of the amount of on-hand inventory a business will carry versus a percentage of time when they desire to have the goods/components available. Complicating this analysis is the variable nature of demand and/or usage of goods/components including, without limitation, consumer demand, product sales growth/decline, the unpredictability of supply lead-time for re-ordering goods/components, and the unpredictability of the quality of the goods/components, etc. To attempt to address these and other concerns, a number of "lean flow' inventory management systems have been implemented. While such inventory management systems typically utilize different re-order points and replenishment quantities, these systems generally attempt to reduce inventory carrying costs. Such systems include fixed-rate supply systems (where replenishment inventory is supplied at a fixed rate) and make-to-order systems (where products are only manufactured after they are ordered). Another management system is a "just-in-time" production/stocking system often referred to as Kanban. Generally, in the Kanban system, a small on-hand inventory is maintained and this on-hand inventory is replenished as it is depleted. Upon depletion of a good/component to a predetermined level, the Kanban inventory control system authorizes production or movement of replacement goods/components. Historically, Kanban was a card or signboard that was attached to specific parts in a production line. These cards and signboards signify the need for replenishment of a given quantity of the specific part. The authorized replenishment quantity is preferably minimized to reduce carrying costs. The replenishment quantity for a specific part or item is determined in part by the demand rate for the item and the time required to produce or acquire more of the items. The replenishment quantity generally is established and remains unchanged unless demand or other circumstances are altered dramatically; in this way inventory is kept under control while production is forced to keep pace with shipment volume. While originally a card system used in Japan, Kanban systems now include empty containers, empty spaces and even electronic messages to signal the need for replenishment of depleted items.

When implemented, the Kanban system operates according to the following rule: all production and movement of parts and material takes place only as required by a downstream operation, i.e. all manufacturing and procurement are ultimately driven by the requirements of final assembly or equivalent (e.g., sales). The Kanban system has been adapted to have various formats and content as appropriate for usage with different businesses. For example, a Kanban system for a retail business is different than a Kanban system for a manufacturing business. Regardless, any Kanban system incorporates a method for signaling suppliers or upstream production operations when it is time to replenish depleted stocks of goods, components or subassemblies based on consumption.

While simple in concept, the variable nature of business sales and/or production makes determining when and how many replenishment items should be ordered a difficult problem. Ideally, the time and quantity of the replenishment order should allow the on-hand inventory and hence inventory investment to be minimized while ensuring adequate supplies for nearly uninterrupted manufacturing operations and/or sales.

SUMMARY OF THE INVENTION

The inventors have recognized that five main factors influence the application of lean flow techniques to any given materials component (as used herein, materials component is meant to include, without limitation, finished goods and products, manufacturing components as well as raw materials). These factors are:
1. Customer-lead-time expectations.
2. Replenishment lead-time variability for each component.
3. Usage variability for each component.
4. Contribution of each component to overall product cost.
5. Optimal replenishment frequency for each component.

Generally, customer-lead-time expectations vary with a given product. For instance, when a product is a commodity, customers generally expect short to zero lead-time. If a provider of the commodity doesn't have the commodity on-hand, the customer will find a different provider. On the other end of the spectrum are highly specialized products that customers typically expect to order well in advance of a required shipment date. Most products fall between these extremes. For any given product, a customer service level exists that needs to be met for a business to be successful.

The inventors have further recognized that little control can be exerted over customer lead-time expectations. Accordingly, the inventors have recognized that optimizing the financial performance of inventory may be done in conjunction with maintaining a desired or necessary customer service level for a given product while focusing on factors 2 through 5.

The replenishment lead-time for each component of a product may vary. For instance, a finished product may include multiple separate components and each component may have a different replenishment lead-time. At least an average replenishment lead-time for each component should be known. However, it should further be realized that an average lead-time means that 50% of the time the lead-time is less than the average and that 50% of the time the lead-time is greater than the average. The inventors have realized it is desirable for the lead-time values utilized in inventory management to be set at a value that assures a predetermined percentage (e.g., 99%) of component deliveries fall within the lead-time utilized for inventory management purposes.

Usage of individual components may vary on a daily basis. While an average usage over a given time period is an easy calculation for most inventory management systems, such an average usage typically assumes a constant rate of consumption, which is typically not true in actual settings. Factors such as seasonal demand, product growth and other variable factors may affect the usage of a given component. Stated otherwise, in actual setting components are subject to irregular variation.

While irregular variation is by definition unpredictable it is also quantifiable. For instance, historical usage variation can be analyzed statistically to determine, for example, the standard deviation, which is a measure of variability. Accordingly, the inventors have determined it may be desirable to maintain an inventory that accounts for statistical variation. That is, a statistical cushion may be added to inventory levels to assure no components are fully depleted during, for example, an abnormally large component usage day. While this may require additional inventory investment, it may be balanced against the potential of missing a delivery/sale and/or reduced efficiency. In a further option, the inventors have recognized inventory management may provide greater benefits when applied to only certain components of a given product. For instance, it is generally accepted that most of a product's cost is represented by a small group (e.g., 20%) of the components that make up the product. Accordingly, in some instances most of the benefit of inventory optimization may be achieved by optimizing the inventory of the high-cost components, which have high carrying costs, while maintaining high volumes of low cost components, which have low carrying costs. Further, for such low cost components, frequent replenishment increases acquisition costs (e.g., shipping) and may offset the benefit of optimized inventory.

Typically, it is desirable for replenishment frequency for a component to strike a financial break-even between asset carrying cost savings, or asset utilization improvement targets, and increased component acquisition costs. The potential for carrying cost savings is greater on the relatively small number of high-cost materials which can be profitably replenished more frequently. In contrast, frequent replenishment of the majority of low cost component may generate more acquisition costs than carrying-cost savings.

In view of the above factors, the inventors have devised a statistical inventory management system that optimizes inventory investment in view of a number of different factors. Generally, the system determines an optimal component replenishment frequency and may determine this frequency in view of the lead-time usage variability of the component. This information is based on actual historical usage data as opposed to unsupported forecasts (e.g., sales growth forecasts etc). In this regard, the system analyzes historical production and/or consumption data for a component and conducts a mathematical analysis to determine fluctuations in usage over time within a supplier lead-time for the component. Resulting calculations generate target inventory levels that will ensure there will be enough material on hand and/or on order to meet a specified service level.

According to a first aspect, a method for use in inventory control is provided. The method includes identifying a supplier lead-time for an inventory component. Daily usage data for the inventory component is also obtained. The daily usage data corresponds to a volume of daily usage for the inventory component (e.g., sales and/or consumption). The daily usage data is summed for a plurality of at least partially non-overlapping time periods that are each equal in duration to the supplier lead-time period for the component. The result is a plurality of lead-time usage data points. These lead-time usage data points are processed to produce a target inventory level for the inventory component.

In one arrangement, the plurality of at least partially non-overlapping time periods are series of time periods equal in length to the supplier lead-time period. In such a series, each subsequent non-overlapping time period may include the most recent day for which usage data is available while excluding the oldest daily usage data. That is, subsequent time periods have data that is 'most recent in' last out'. As will be appreciated, two or more of the plurality of the time periods may be completely non-overlapping.

The target inventory level may include a combined total of on-hand inventory and/or on-order inventory for the inventory component. What is important is that, upon an actual inventory level being less than the target inventory level, a replenishment order for an additional quantity of the inventory component be placed.

In one arrangement, processing the plurality of lead-time usage data points includes performing a statistical analysis on the data points to calculate a base inventory level. Such a base inventory level may include determining an average value of at least a portion of the plurality of lead-time data points. Alternatively, the base inventory level may be calculated by generating a function that characterizes at least a portion of the lead-time data usage points. This function may then be utilized to calculate a base inventory level for, for example, an upcoming time period. In any case, it may be desirable to add a statistical variance to the base inventory level to account for variations in daily/weekly use and/or consumption of the inventory component. In this regard, the target inventory level may include the base inventory level and a statistical variance amount.

A statistical variance amount may be calculated from a variation of the lead time usage data points. For instance, such a statistical variance may be at least partially related to the standard deviation of the lead-time data points. Further, such standard deviation information may be multiplied by, for example, the number of standard deviations that include a predetermined percentage of lead-time data usage points. In this regard, this predetermined percentage may correspond to a desired customer service level. That is if a 99% customer service level is desired the number of standard deviations that include 99% of the lead-time usage data points may be identified. This number of standard deviations may then be utilized in calculating a statistical variance amount.

In another arrangement, processing may include generating a function that characterizes at least a portion of the lead-time data points. This function may then be utilized to calculate a target inventory level. For instance, a linear regression may be performed on the lead-time-data points in order to fit a line to those points. An equation of this line may then be utilized for target inventory level calculations.

According to another aspect of the present invention, a method for use in an inventory control systems is provided. The method includes obtaining a plurality of component usage data values for a period of time. These component usage data values each at least partially correspond to a daily consumption volume of an inventory component. A variation of the daily consumption volume is also identified. At least a portion of this variation may then be removed from each of the plurality of component usage data values to generate a plurality of adjusted usage data values. The adjusted usage data values may then be utilized to produce a target inventory level.

By removing the variation from the component usage data values, an observable or pre-determinable variation may be eliminated from inventory size calculations. For instance, product growth can be positive or negative but is often a sustained pattern. For instance, product growth may be substantially constant month-to-month. In contrast, true variation due to factors other than product growth, such as daily manufacturing output, may be substantially unpredictable. By removing the observable or pre-determinable variation from a set of usage data values, the variation (i.e., true variation) of the adjusted data values may be analyzed. Such analysis may identify true variation and may be utilized to mare accurately calculate target inventory levels.

Identifying observable or pre-determinable variations may include fitting a function to the plurality of component usage data values to characterize those values. Furthermore, a portion of this function may then be removed from each component usage data value to generate each adjusted usage data value. The pre-determinable/observable variation may include one or more of: seasonal variations, product sales growth variations, product sale reduction variations, expected variations due to marketing and/or product life cycle variations.

Analysis of the plurality of adjusted data values may be performed to produce a statistical variation amount. This statistical variation amount may then be utilized to produce the target inventory level. For instance, the statistical variation amount may be added to a base inventory level to account for day-to-day variation of inventory component usage.

According to another aspect of the present invention, a method for use in an inventory control system is provided that includes identifying a supplier lead-time period for an inventory component and summing daily usage data for the inventory component for a plurality of at least partially non-overlapping time periods. The time periods are each equal in duration to the supplier lead-time period. The result is the generation of a plurality of lead-time usage data points. These lead-time usage data points are statistically analyzed to identify a statistical variation amount. Finally, a target inventory level is produced that includes the base inventory amount and the statistical variation amount.

In one arrangement, a base inventory level is calculated from historical usage data that includes at least one of the daily usage data and/or the plurality of lead-time usage data points. In this regard, an average over a given time period may be utilized as a base inventory level, or a function that characterizes the historical data may be utilized to forecast the base inventory level. Alternatively, the base inventory level may correspond to general sales/consumption forecasts.

In one arrangement, statistically analyzing the plurality of lead-time usage data points includes calculating a standard deviation of the lead-time data points. Further, the number of standard deviations that correspond to a desired service level for the component may be utilized for determining a statistical inventory amount target inventory level. That is, if a 99.5% customer service level were desired, a standard deviation includes 99.5% of the lead-time data usage points may be utilized. Accordingly, and desired service level may be selected by a user of the system.

BRIEF DESCRIPTION OF THE DRAWINGS

FIG. 3 is a table illustrating a historical usage matrix.
FIG. 4 is a table illustrating component information.
FIG. 6 is a table illustrating historical usage and lead-time usage.
FIG. 10 is a table illustrating the calculation of a statistical inventory.
FIG. 11 is a table correlating standard deviation to service level.

DETAILED DESCRIPTION

Reference will now be made to the accompanying drawings, which assist in illustrating the various pertinent features of the present invention. Although the invention will now be discussed primarily in conjunction with a lean flow inventory management system for manufacturing businesses, it should be expressly understood that the invention is applicable to other inventory management settings. For instance, one or all aspects of the invention may be applied to inventory management of retail businesses. In this regard, the following description of an inventory management system is presented for purposes of illustration and is not intended to limit the invention to the form or applications disclosed herein. Consequently, variations and modifications consummate with the following teachings, and skill and knowledge of the relevant art, are within the scope of the present invention.

Figure 1:
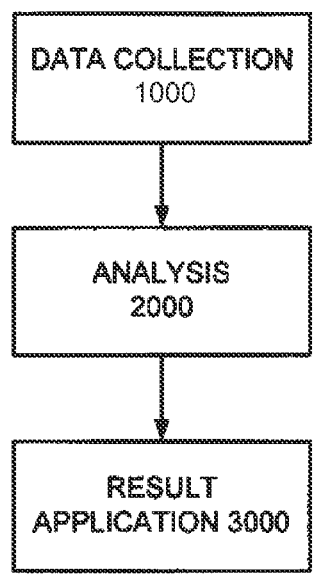
FIG. 1 is a flow chart illustrating the overall system.

The present invention is directed to a lean flow inventory management system that utilizes a statistical inventory sizing method to optimize inventory of on-hand and/or on-order components. As utilized herein, the term 'component' is meant to include any item, which may be inventoried for subsequent sale and/or use in, for example, a manufacturing process. Non-limiting examples include finished goods, individual parts utilized to produce finished goods and raw materials. As shown in FIG. 1, the overall system includes three general steps: data collection 1000, analysis 2000 and result application 3000. Each of these steps is more fully discussed herein.

Data Collection

Information regarding each component utilized by a manufacturer must be identified such that statistical inventory sizing of the inventory of that component may be performed. Initially, products or 'end items' (i.e., a semi finished or finished products) that are sold to a customer are identified (1010). See FIG. 2. That is, end items which are sold to customers may be identified by, for example, a part number. Supplementary information regarding each end item is also obtained and includes obtaining service level information (1020) and obtaining historic usage information (1030) for each end item. The service level is usually expressed as a percentage, based on a strategic decision balancing the cost of inventory investment versus the cost of not having on-hand availability for a given end item. This is normally determined by a user of the system. Often, the end item service level will match the company's desired customer satisfaction target such as, for example, an on time delivery target, an order fill rate target or other target.

Historic usage data obtained (1030) for each end item may include daily sales or production of a given end item. Generally, it is desirable to have as many data points as are available. In one embodiment, it is preferred to have at least 26 data points available to provide a better statistical data set for use in subsequent analysis. In one embodiment, this data is saved in matrix (See FIG. 3) with the end items (e.g., Part A and Part B) down a left hand side of the matrix and with calendar dates 30 across the top (left to right). The matrix is then filled with daily usage data. Alternatively, usage data may be weekly or monthly. However, use of daily data provides more data points and thus higher granularity for subsequent analysis.

Optionally, forecast data may be gathered for one or more end items as well. Such forecast may be directed to anticipated growth, seasonal growth, decline, etc. The availability of forecasting data may depend upon the end items. For instance, in some markets there is a wealth of available forecast information available (e.g., clothing retail, food retail and holiday sales) while in other markets such forecast information may not be available. Accordingly, gathering forecast information may be optional. Once an end item is identified (1010), the individual components of that item are identified (1040). Generally, for each end item a bill of materials is available, which is a formal list of the components utilized to produce the end item. Typically, such a bill of materials will list the components with a name, reference number, a quantity necessary for the end item and one/one or more units of measure/tolerances etc. Such bills of materials (BOM) may include an engineering BOM and a manufacturing BOM.

Once each individual component is identified 1040, information for each component is gathered 1050. See FIG. 4. As shown in FIG. 4, each individual component may be identified by a part number 111, 222, 333, 444 and various information may be tabulated in a table 20 for each component 111-444. As shown, a target service level 30 may be included within the tabulation. Generally, the target service level of each component must be greater than the desired service level of the end item. That is, if any one individual component 111-444 becomes unavailable, the end item cannot be produced.

In one arrangement, the individual component service level 30 is derived based on the end item service level (1020). The independent component service level is calculated by taking a root value of the end item service level based on the number of individual component used to produce the end item. For instance, if an end item includes four components, the service level 30 of each component will equal a fourth root of the end item service level. By way of further example, if the end item has a desired service level of 95% and there are 20 components that are utilized to manufacture the end item, then the required component service level is 0.997 (i.e., the 20th root of 0.95).

A supplier lead-time 40 is also identified for each component. See FIG. 4. Supplier lead-time for each component 111-444 preferably is in the same time units as the usage data (1030) of the end item. For instance, if the usage data is in days it is preferred that the supplier lead-time also be in days. A minimum order quantity 50 is also identified for each component 111-444. This is the minimum quantity available for purchase from the supplier. When a replenishment order is generated, the size of the order for a given component must meet the minimum quantity as dictated by the supplier. A unit cost 70 is also identified for each component 111-444. The unit cost represents the material cost of each individual component and can also include labor and overhead costs.

As shown, the priority determination 60 is also made for each component 111-444. This priority determination 60 may dictate whether statistical inventory sizing will be performed for a given component 111-444.

In one arrangement, the priority determination 60 comprises an ABC segmentation or 'Pareto' analysis. In this regard, all components of an end item are sorted by cost. The components are then classified in a scheme that ranks the component based on annual usage multiplied by cost/price. For instance, A items may account for the top 20% of the total number of components and 60-70% of the dollar volume. B items may account for the next 20-25% of the number of components and 20-30% of the dollar volume and C items may account for the remaining 60-70% of the number of components and only 15-30% of the dollar volume. The ABC categories may then be used in specifying the amount of attention in terms of control paid to certain components. For instance, statistical inventory sizing may be performed for A items and not for B or C items. In this regard, the acquisition costs for frequent replenishment of the B and C items may outweigh the benefits of maintaining lean flow inventories permitted by statistical analysis. Of course, other variations may exist for prioritizing different components. The data associated with each end item and each individual component is stored (1060) in a database. See FIG. 2.

Figure 2:
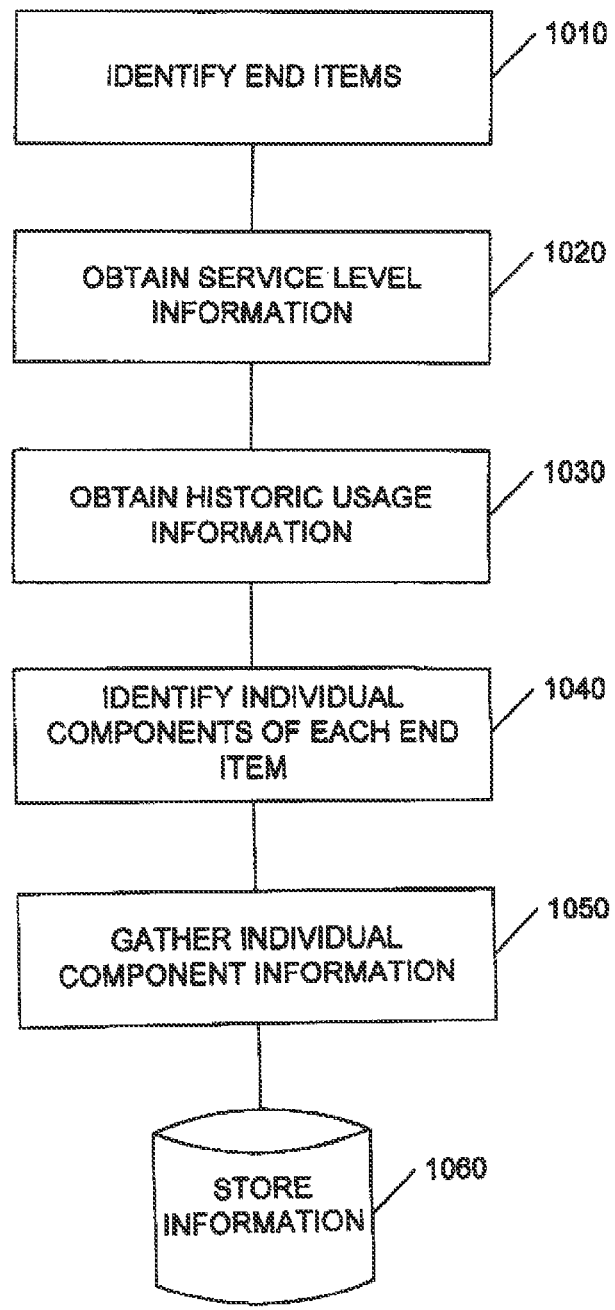
FIG. 2 is a flow chart illustrating data collection.

The acquisition of the information discussed in conjunction with FIG. 2 may be repeated for each end item. Of note, different end items may utilize common components. Accordingly, information for common components may be compiled to provide an overall usage of a given component. Accordingly, statistical inventory sizing, as set forth herein, may be performed for a component that is utilized to produce two or more end items.

Analysis

Figure 5:
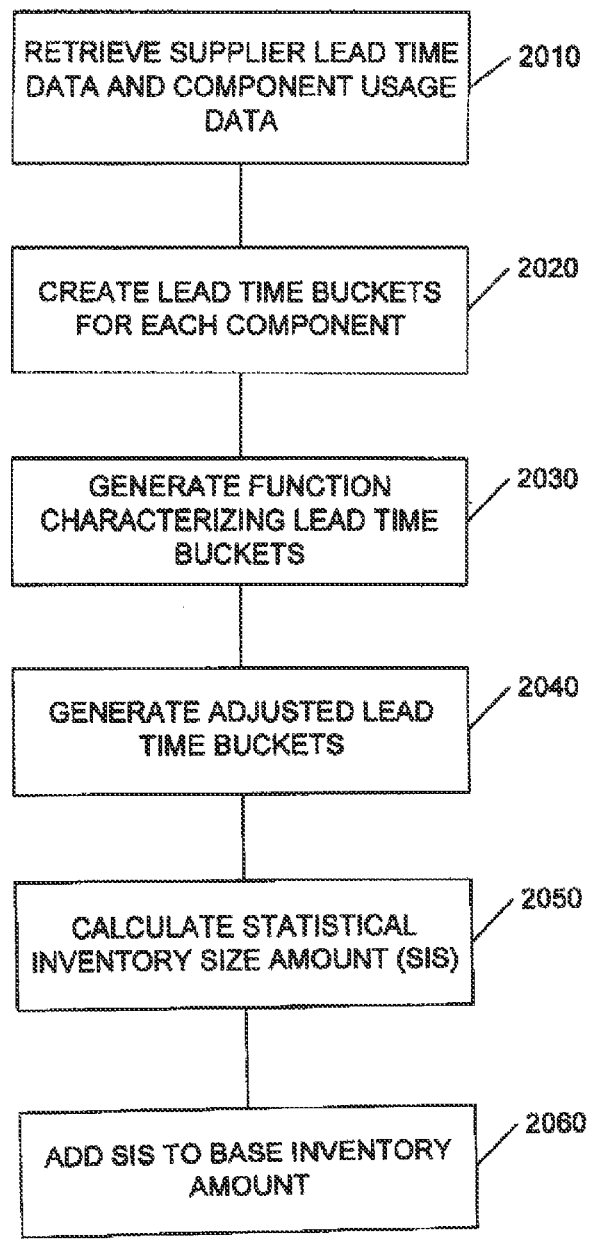
FIG. 5 is a flow chart illustrating analysis of the data.

Once the data collection (1000) is completed, the data may be analyzed (2000) to produce statistical inventory sizing for a given component. FIG. 5 broadly illustrates the analysis (2000) of the collected data. Initially, usage history and supplier lead tine information is retrieved (2010) from the database for each component. Of note, the usage data corresponds to the usage data for the end item(s) in which the component utilized is multiplied by the number of components utilized for each end item(s). The retrieved data is utilized to create lead-time groups or buckets for each component for which a statistical analysis will be performed. Data corresponding to the lead-time buckets is tabulated. See FIG. 6. As shown in FIG. 6, a first component, Part A, has a supplier lead-time of 7 days and a second component, Part B, has a supplier lead-time of 3 days. The lead-time buckets for each part is a summation of the historical usage data across the supplier lead-time for each component. For part A having a seven day lead-time, the first seven daily usage entries are summed to provide a first lead-time bucket on 5/7 that corresponds to usage from 5/1 through 5/7. On 5/8 daily usages from 5/2-5/8 are summed to provide a second lead-time bucket. The same is true for part B except that three day summations corresponding to the three day supplier lead-time are utilized for the lead-time bucket calculation.

Figure 7:
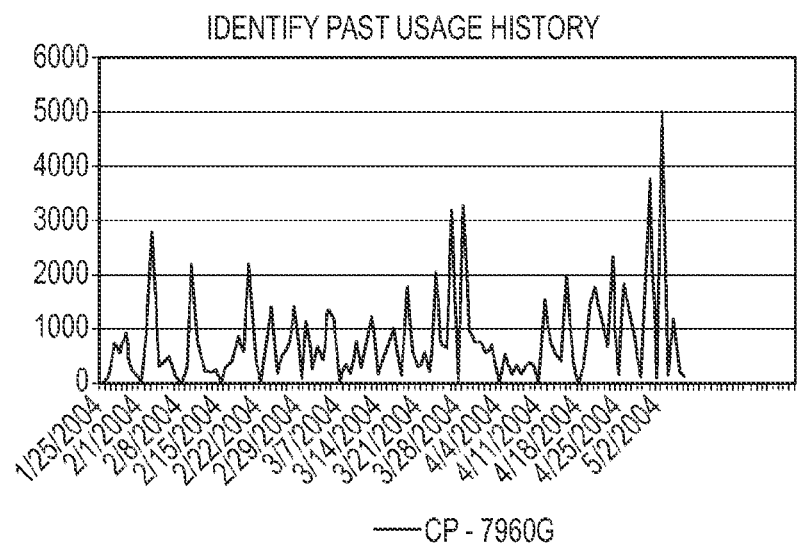
FIG. 7 is a plot showing daily usage variance.
Figure 8:
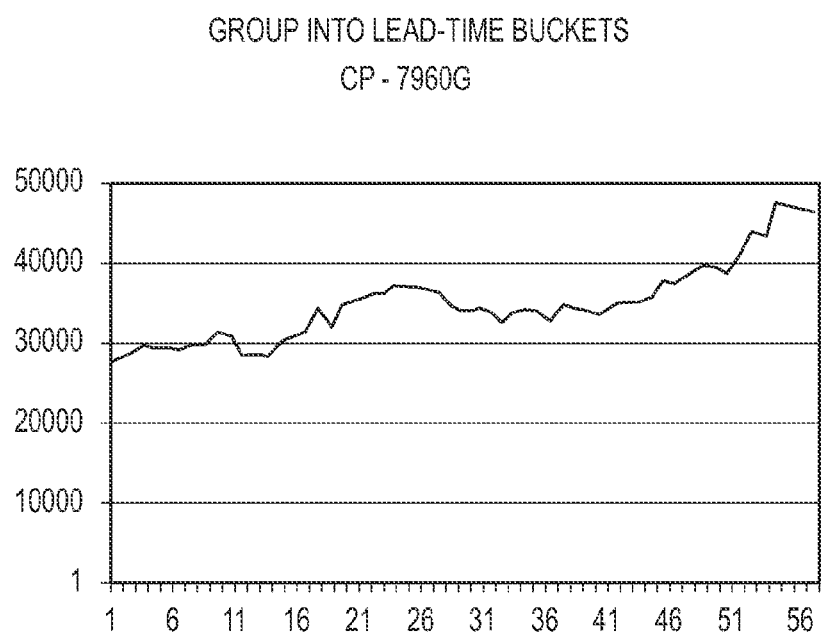
FIG. 8 is a plot showing lead-time usage.

Use of the lead-time buckets allows for smoothing daily usage of a given component. For example, FIG. 7 illustrates the daily usage of an exemplary component utilized in the manufacture of an end item. As shown, there is a large variance in the daily usage. In contrast, FIG. 8 shows a plot of lead-time buckets corresponding to the component of FIG. 7. As shown, the high variability of the daily usage is smoothed into less variable plot which may be utilized for statistical inventory sizing of the component. Once grouped (2020) into lead-time buckets, analysis of FIG. 5 may continue.

Figure 9:
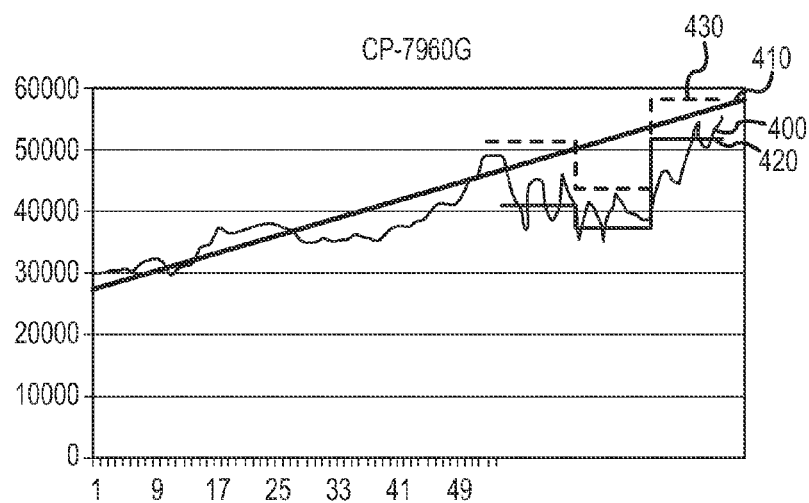
FIG. 9 is a plot illustrating inventory forecasting.
Figure 12:
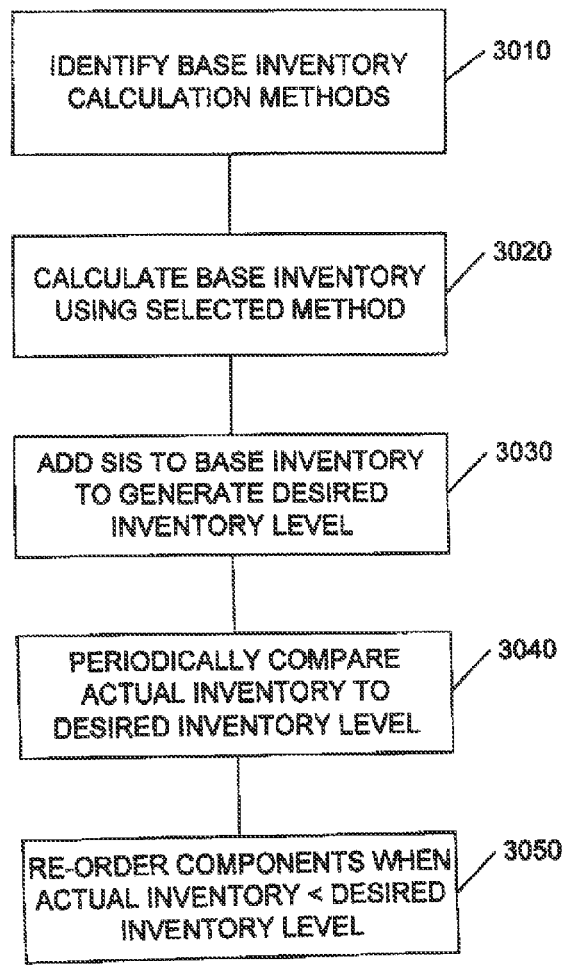
FIG. 12 is a flow chart illustrating application of the analysis.

To provide statistical inventory sizing for a component, a function characterizing the lead-time buckets may be generated (2030). Generally, such a function allows for identifying a variation over a time period associated with the lead-time buckets. For instance, in one arrangement, generating the function may include performing a slope analysis. In one arrangement, the slope analysis includes performing a linear regression to fit a line to the lead-time buckets. As shown in FIG. 9, the lead-time buckets, which correspond to actual daily usage of a component, is illustrated by line 400. A linear regression analysis of the lead-time buckets resulted in sloped line 410. As will be discussed herein, the function of the sloped line 410 may be utilized for inventory calculation purposes (i.e., inventory forecasts).

Identification of the sloped line 410 allows for identifying growth or reduction of volume across the lead-time buckets that is attributable to factors other than day-to-day variation. Such variation may be attributable to one or more factors such as seasonal demand, product acceptance, product life cycles (e.g., product phase out), and growth. In any case, by identifying growth or reduction over the lead-time buckets (e.g., the slope of line 410), the increase or decrease due to this variation may be removed from each lead-time bucket. This allows for generating (2040) adjusted lead-time buckets that are free of growth or reduction that may be caused due to factors other than day-to-day variation. See FIG. 5. Stated otherwise, when looking at inventory demand, there are often two key factors that will cause changes which need to be considered. The first factor is growth. Growth can be positive or negative (e.g., reduction), but it is typically a sustained pattern that shows a month over month change in demand. Growth is typically a predictable change. The second factor is true variation. This is simply the unpredictable nature of inventory use patterns. For instance, a business may know what customers will order on average, but typically don't know what they will order day to day. When doing a statistical review, it is desirable to identify this true variation free of growth.

In order to focus in true variation free of growth, one option is to apply a well accepted technique for determining growth. Specifically, a linear regression of the lead-time buckets data may be performed to determine the slope of the growth. The slope may equate to, for example, a 10% per annum growth pattern. Since it is known that the demand is growing at this rate, this 10% variation does not need to be considered as part of the true variation. The growth is predictable, so it may be removed from the analysis. For instance, the lead-time buckets may be adjusted according to the slope, essentially flattening the growth out of the resulting adjusted lead-time buckets. At this point, the adjusted lead-time buckets only show true variation, which now may be statistically analyzed to identify (e.g., size) true variation.

After generating (2040) adjusted lead-time buckets, a statistical inventory amount is calculated. The statistical inventory amount is an amount of inventory for a component in addition to a base inventory amount that needs to be on-hand and/or on-order to ensure that an end item service level is maintained. For instance, in one arrangement, a base inventory amount may be determined by identifying an average over the lead-time buckets and using this average as the base inventory amount. As shown in FIG. 9, use of simple averaging of the lead-time buckets to establish an inventory is illustrated by line 420. As shown, the base inventory line 420 is often below the actual daily usage line 400. Without a cushion inventory (i.e., a statistical inventory amount) there would be a component shortage each time base inventory line 420 is below the actual daily usage line 420. To prevent such component shortages, the additional statistical inventory amount is added to a forecast amount, which may coincide with the average daily usage of the component. Generally, the additional statistical inventory is an amount of inventory that allows for cover additional usage above and beyond an average usage amount.

The additional statistical inventory amount is calculated (2050) from the adjusted lead-time buckets such that the additional statistical inventory is not over estimated. That is, by removing the slope, which may correspond to long term growth/reduction, from the lead-time buckets the variance between individual lead-time buckets is reduced. This variability is in part what determines the additional statistical inventory.

Referring to FIG. 10, the statistical inventory amount calculation is illustrated for a component. As shown, an average $\mu$ for a plurality of lead-time buckets is initially calculated. This average, 68.4 in the present instance, may be utilized as a base inventory value. Alternative methods may be utilized to produce a base inventory value as well. In any case, the standard deviation '$\sigma$' of the plurality of lead-time buckets may be calculated. This standard deviation is multiplied by a service level factor x. As shown in FIG. 11, the service level factor x is correlated to a standard deviation chart. Specifically, the service level factor x is the number of standard deviations 6 in which a predetermined percentages of the lead-time buckets fall. This percentage is equated to a required service level for the component. As shown in FIG. 10, a service level for the component of 99.9% is required. The service level factor that equates to 99.9% for this set of lead-time buckets is 3.09, or therefore 3.09 standard deviations.

For purposes of the calculation as shown in FIG. 10 a rounded value of 3 is utilized for the service level factor. Multiplying the standard deviation (5) by the service level factor (3) results in additional statistical inventory amount (15). This additional statistical inventory amount may be added to a base inventory level to provide a statistical cushion. Once the additional statistical inventory is calculated (2050), it may be added (2060) to a base inventory level to establish a desired or target inventory level.

As shown in FIG. 9, when the statistical inventory amount is added to the base inventory 420, the result is a target inventory line 430 (e.g., a target inventory). As shown, the target inventory line 430 is greater than the actual usage line 400 at all times. However, it will be further noted that the target inventory line 430 is at times less than the slope line 410. In this regard, utilization of the target inventory amount may at times reduce the amount of on-hand inventory in relation to slope forecasting. In any case, the target inventory maintains enough inventory on-hand to allow for variations in actual usage.

Result Application

Though discussed above as being added to a base inventory amount, it will be appreciated that a number of different base inventory calculations may be utilized. See FIG. 11. In this regard, several different methods for calculating a base inventory level may by identified (3010). For instance, an average across all the lead-time buckets may be utilized to determine an average (i.e., base inventory value), or, an average may be taken across the most recent lead-time bucket. Alternatively, a function defining one or more of the buckets may be defined and utilized to calculate a base inventory level. For instance, the function may define a slope of the line corresponding to the lead-time buckets. The equation of the line may be utilized to forecast the base inventory level for an upcoming time period. Of note, such a 'statistical forecast' is based upon historical usage and/consumption rather than general sales forecasts, which may be influenced by factors such as, for example, sales goals, marketing projections etc. Stated otherwise, general sales forecasts are often based on non-supported or minimally supported conjecture whereas statistical forecasting utilizes actual quantifiable data. Of course, in instances where no data is available (e.g., new products) general sales forecasts may be utilized to establish a base inventory level. Different methods may be preferable for different products and/or components.

In any case, one method is selected 3020 to calculate a base inventory level, and the SIS amount is added (3030) to the base inventory level. The resulting desired inventory level (i.e., reorder point) may then be periodically compared (3040) to actual on-hand and/or on-order inventory. Once the balance of on-hand inventory and/or on-order inventory for a particular component dips below the desired inventory level, a replenishment order is issued (e.g., to a component supplier). Such a replenishment order may be issued manually or by computer.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method of using an inventory control system having a computer and one or more databases, the inventory control system processing and providing an output utilizing data stored in and retrieved from the one or more databases, the method comprising:
   depleting an inventory level of an inventory component;
   identifying a supplier lead-time period for replenishment of the inventory component;
   obtaining daily usage data for said inventory component, said daily usage data corresponding to a volume of daily usage for said inventory component;
   storing the supplier lead time period and the daily usage data for said inventory component in the one or more databases;
   summing, using said inventory control system, said daily usage data for a plurality of at least partially non-overlapping time periods that are each equal in duration to said supplier lead-time period to generate a plurality of lead-time usage data points, each one of said plurality of at least partially non-overlapping time periods corresponding with a time period that is at least partially different from time periods corresponding with each of the other ones of said plurality of at least partially non-overlapping time periods, and wherein for each one of said plurality of at least partially non overlapping time periods a corresponding one of said plurality of lead-time usage data points corresponds with a total summed amount of said daily usage data for the time period to provide a corresponding lead-time bucket;
   retrieving, using said inventory control system, the supplier lead time period and the daily usage data from the one or more databases for use in said summing step;
   processing, using said inventory control system, said plurality of lead-time usage data points to produce a target inventory level for said inventory component;
   outputting, using said inventory control system, an indication corresponding to said target inventory level produced in said processing step;
   determining an actual inventory level for said inventory component;
   comparing said actual inventory level to said target inventory level;
   generating an order for an additional quantity of said inventory component when an actual inventory of said inventory component is less than said target inventory level; and
   placing said order with a corresponding supplier of said inventory component, wherein said inventory level of the inventory component is replenished.

2. The method of claim 1, wherein said target inventory level comprises a combined total of on-hand inventory and on-order inventory for said inventory component.

3. The method of claim 1, further comprising:
   issuing said order with use of a computer.

4. The method of claim 1, wherein said actual inventory includes on-hand inventory and on-order inventory.

5. The method of claim 1, wherein said target inventory level comprises a daily target inventory level.

6. The method of claim 1, wherein said processing further comprises:
   performing a statistical analysis of said plurality of lead-time usage data points to calculate a base inventory level.

7. The method of claim 6, wherein said performing said statistical analysis comprises at least one of:
   determining an average value of at least a portion of said plurality of lead-time usage data points, wherein said average value comprises said base inventory level; and
   generating a function to characterize at least a portion said plurality of said lead-time usage data points, wherein said function is utilized to calculate said base inventory level.

8. The method of claim 6, further comprising:
   adding a statistical variance to said base inventory level, wherein said target inventory level comprises said base inventory level and said statistical variance.

9. The method claim 8, wherein said statistical variance is at least partially related to a standard deviation of said plurality of said lead-time data points.

10. The method of claim 6, further comprising:
    analyzing said plurality of lead-time data points to identify trend information corresponding to one of growth in use and reduction in use for said inventory component; and
    removing said trend information from each of said plurality of lead-time data points to generate a plurality of adjusted data points.

11. The method of claim 9, further comprising:
    utilizing said adjusted data points to calculate a statistical variance.

12. The method of claim 1, wherein said processing comprises:
    generating a function to characterize at least a portion said plurality of lead-time usage data points, wherein said function is utilized to forecast said target inventory level.

13. The method of claim 1, wherein said processing comprises:

identifying a variance in said plurality of lead-time data points; and using said variance to produce said target inventory level.

14. The method of claim 13, wherein said identifying said variance comprises:

identifying a standard deviation of said plurality of lead-time data points; and using said standard deviation to calculate an inventory variance component of said target inventory level.

15. The method of claim 1, further comprising:

obtaining a plurality of component usage data values for a period of time associated with said plurality of at least partially non-overlapping time period, said plurality of component usage data values at least partially corresponding to daily consumption volumes of said inventory component consumed during said period of time;

identifying a variation of said daily consumption volumes for said period of time;

removing at least a portion of said variation from said plurality of component usage data values to generate a plurality of adjusted usage data values;

using said plurality of adjusted data values in said processing step; and outputting an indication corresponding to said target inventory level.

16. The method of claim 15, wherein processing further comprises:

performing a statistical analysis of said plurality of adjusted data values to produce a statistical variation amount associated with said plurality of adjusted data values.

17. The method of claim 16, wherein performing said statistical analysis values said further comprises:

calculating an average value for said adjusted data values; and calculating a standard deviation of said adjusted data values.

18. The method of claim 17, wherein producing said statistical variation amount comprises:

identifying a number of standard deviations including a predetermined percentage of said adjusted data values and said multiplying said standard deviation by said number.

19. The method of claim 16, wherein producing said target inventory level comprises adding said statistical variation amount to a base inventory level.

20. The method of claim 19, further comprising determining said base inventory level, wherein determining said base inventory level comprises one of:

determining an average value of at least a portion of said plurality of component usage data values, wherein said average value comprises said base inventory level; and generating a function to characterize at least a portion said plurality of component usage data values, wherein said function is utilized to calculate said base inventory level.

21. The method of claim 15, wherein said plurality of component usage data values comprises:

said plurality of lead-time usage data points.

22. The method of claim 15, wherein said identifying said variation further comprises:

generating a function characterizing said plurality of component usage data values.

23. The method of claim 22, wherein said generating said function comprises:

fitting a line to said plurality of component usage data values.

24. The method of claim 23, wherein said identifying a variation comprises:

identifying a slope of said line.

25. The method of claim 24, further comprising:

using said slope to calculate said adjusted usage data values.

26. The method of claim 15, wherein said identifying said variation of said daily consumption volumes comprises:

identifying at least one predeterminable variation.

27. The method of claim 26, wherein said at least one predeterminable variation consists of at least one of:

a seasonal variation;

a product sales growth variation;

a product sale reduction variation;

an increased marketing variation; and product life cycle variation.

28. The method of claim 1 further comprising:

statistically analyzing said plurality of lead-time usage data points to identify a statistical variation amount, wherein said target inventory level is produced to include a base inventory amount and said statistical variation amount.

29. The method of claim 28, further comprising:

calculating said base inventory level from historical usage data including at least one of:

said daily usage data; and said plurality of lead-time usage data points.

30. The method of claim 29, wherein said calculating comprises:

calculating an average of at least a portion of said historical usage data, wherein said average comprises said base inventory level.

31. The method of claim 29, wherein calculating comprises:

generating a function characterizing said historical usage data; and utilizing said function to forecast said base inventory level.

32. The method of claim 28, wherein statistically analyzing said plurality of lead-time usage data points further comprises:

calculating a standard deviation of said plurality of lead-time data points.

33. The method of claim 32, wherein identifying said statistical amount comprises:

identifying a number of standard deviations that includes a predetermined percentage of said plurality of data values; and multiplying said standard deviation by said number to generate said statistical amount.

34. The method of claim 32, wherein said predetermined percentage corresponds to a desired service level.

35. The method of claim 28, wherein said statistically analyzing further comprises:

identifying a variation within said plurality of lead-time usage data points;

removing at least a portion of said variation from each of said plurality of lead-time usage data points to produce adjusted usage data values.

36. The method of claim 35, further comprising:

analyzing said adjusted usage values to identify said statistical variation amount.

37. The method of claim 1, further comprising:

using a computer in said generating step.

38. The method of claim 1, further comprising:

using said inventory component to produce finished goods subsequent to said replenishment of said inventory level of the inventory component.

39. The method of claim 1, further comprising:
selling one of said inventory component and goods comprising said inventory component subsequent to said replenishment of said inventory level of the inventory component.

40. A method of using an inventory control system having a computer and one or more databases, the inventory control system processing and providing an output utilizing data stored in and retrieved from the one or more databases, the method comprising:
depleting an inventory level of an inventory component;
storing a supplier lead-time period for the inventory component in the one or more databases;
storing daily usage data for the inventory component in the one or more databases, the daily usage data corresponding to a volume of daily usage for the inventory component;
retrieving, using said inventory control system, the supplier lead-time period and the daily usage data from the one or more databases;
summing, using said inventory control system, the daily usage data for a plurality of at least partially non-overlapping time periods that are each equal in duration to the supplier lead-time period to generate a plurality of lead-time usage data points;
processing, using said inventory control system, the plurality of lead-time usage data points to produce a target inventory level for the inventory component;
outputting, using said inventory control system, an indication corresponding to said target inventory level produced in said processing step;
identifying an actual inventory level for the inventory component;
comparing said actual inventory level to said target inventory level;
issuing, via a computer, a replenishment order of the inventory component when the actual inventory level falls below the target inventory level; and
placing said order with a corresponding supplier of said inventory component, wherein said inventory level of the inventory component is replenished.

\* \* \* \* \*